United States Patent [19]
Lindberg et al.

[11] Patent Number: 5,748,308
[45] Date of Patent: May 5, 1998

[54] PROGRAMMABLE STANDARD FOR USE IN AN APPARATUS AND PROCESS FOR THE NONINVASIVE MEASUREMENT OF OPTICALLY ABSORBING COMPOUNDS

[75] Inventors: John M. Lindberg, Grayslake; Robert Eric Heinz, Lake Bluff, both of Ill.

[73] Assignee: Abbott Laboratories, Abbott Park, Ill.

[21] Appl. No.: 595,675

[22] Filed: Feb. 2, 1996

[51] Int. Cl.$^6$ .................... G01J 3/04; G01J 3/28
[52] U.S. Cl. ................ 356/310; 356/326; 356/328
[58] Field of Search ..................... 356/330–334, 356/310, 326, 328, 39, 308

[56] References Cited

U.S. PATENT DOCUMENTS

| | | | |
|---|---|---|---|
| 2,330,877 | 10/1943 | Fleisher et al. | 356/310 |
| 3,837,744 | 9/1974 | Egan et al. | 356/310 |
| 4,193,691 | 3/1980 | Fjarlie | 356/330 |
| 4,575,243 | 3/1986 | Witte | 356/333 |
| 4,790,654 | 12/1988 | Clarke | 356/310 |
| 4,856,897 | 8/1989 | Fateley et al. | 356/333 |
| 4,882,492 | 11/1989 | Schlager | 356/39 X |
| 5,086,229 | 2/1992 | Rosenthal et al. | |
| 5,209,231 | 5/1993 | Cote et al. | |
| 5,218,207 | 6/1993 | Rosenthal | |
| 5,321,265 | 6/1994 | Block | |
| 5,337,745 | 8/1994 | Benaron | |
| 5,361,758 | 11/1994 | Hall et al. | |
| 5,383,452 | 1/1995 | Buchert | |
| 5,504,575 | 4/1996 | Stafford | 356/330 |

FOREIGN PATENT DOCUMENTS

| | | |
|---|---|---|
| 2110246 | 2/1994 | Canada . |
| 0075171 | 3/1983 | European Pat. Off. . |
| 0491131 | 6/1992 | European Pat. Off. . |
| 0600334 | 6/1994 | European Pat. Off. . |
| WO 92/10131 | 6/1992 | WIPO . |
| WO 93/07801 | 4/1993 | WIPO . |
| WO 94/02837 | 2/1994 | WIPO . |
| WO 94/05984 | 3/1994 | WIPO . |
| WO 94/13199 | 6/1994 | WIPO . |

Primary Examiner—K. K. Hantis
Attorney, Agent, or Firm—David L. Weinstein; Gregory W. Steele

[57] ABSTRACT

The present invention provides a programmable filter for use as a standard in correlation spectrometers. Also provided is the use of the programmable standard in a process for determining the concentration of an optically absorbing compound. Also provided is a method and apparatus for noninvasively determining the concentration of an optically absorbing biological sample which incorporates the programmable standard of the invention.

9 Claims, 3 Drawing Sheets

PROGRAMMABLE STANDARD FOR USE IN AN APPARATUS AND PROCESS FOR THE NONINVASIVE MEASUREMENT OF OPTICALLY ABSORBING COMPOUNDS

FIELD OF THE INVENTION

The present invention relates to the noninvasive determination of optically absorbing compounds. More particularly, this invention relates to a programmable standard for use in a correlation spectrophotometric apparatus and process for the noninvasive determination of an optically absorbing compound in a biological sample.

BACKGROUND OF THE INVENTION

Several existing spectroscopic techniques make use of a compound's unique absorption signature at different wavelengths. Knowledge of those absorption signatures for different compounds is then used to determine their concentration in a sample.

By way of example, certain techniques use polarized light. Changes in the polarized light due to the interaction with a compound and knowledge of those changes is used to identify the concentrations of the compound in an unknown sample. In other techniques, the signal from an unknown is correlated or compared to the signature of a known compound (called correlation spectroscopy).

There are major shortcomings attendant to the use of such general spectrophotometric techniques. First, there is a lack of specificity (several compounds have similar signatures) and the scattering of tissue significantly distorts the signature of the compounds. Second, such spectroscopic methods have problems with signal to noise ratios. Thus, either the measurement method is not specific enough (other compounds interfere) or the accuracy of the measurement is low (noisy or poor quality data).

Despite these shortcomings there have been numerous reports of attempts to adapt such techniques to the noninvasive measurement of optically absorbing compounds in biological samples (e.g., in an organism). In particular, such attempts have focused on the measurement of glucose in various body compartments.

Existing methods for the determination of glucose using changes in the polarization of light are limited because they use only part of the entire polarization state such as optical rotation and/or circular dichroism.

For example, U.S. Pat. No. 4,882,492 describes the use of a subtractive correlation spectrometer for the measurement of glucose. In correlation spectrometry the spectra of an unknown sample is compared to the spectra of a standard. The signal out is a measure of how close the unknown sample matches the standard. In this method, the standard which is employed is a glass or plastic cell that contains a high concentration of the analyte of interest.

A major disadvantage of such a system is that the standard is fixed for each measurement and cannot be easily changed. A second disadvantage, as it relates to the measurement of glucose, is that the standard is a high concentration of glucose, which can degrade and change over time. Finally, some interfering substances may have a spectra very similar to the biological compound of interest and may thus interfere with the measurement of that compound.

There continues to be a need to provide a standard that can be utilized at any absorption spectrum and at any concentration. The devices and processes disclosed here provide advantages over existing devices and methods for correlation spectroscopy because the standard used in the instrument is programmable. Thus, any standard spectrum can be created at any concentration. This allows for the unknown to be compared to any number of constituents for correlation. The present invention also allows correlation spectroscopy to be modulated in both time and space. It also provides for the use of gray scale in a programmable standard and eliminates the shelf life problem (e.g., degradation) of existing standard solutions. Finally, the programmable standard of the invention need not match the spectrum of any physical substance. Therefore, the programmable standard may show better immunity from interference than the use of a physical standard.

BRIEF DESCRIPTION OF THE DRAWINGS

In the drawings, which form a portion of the specification.

SUMMARY OF THE INVENTION

Figure 1:
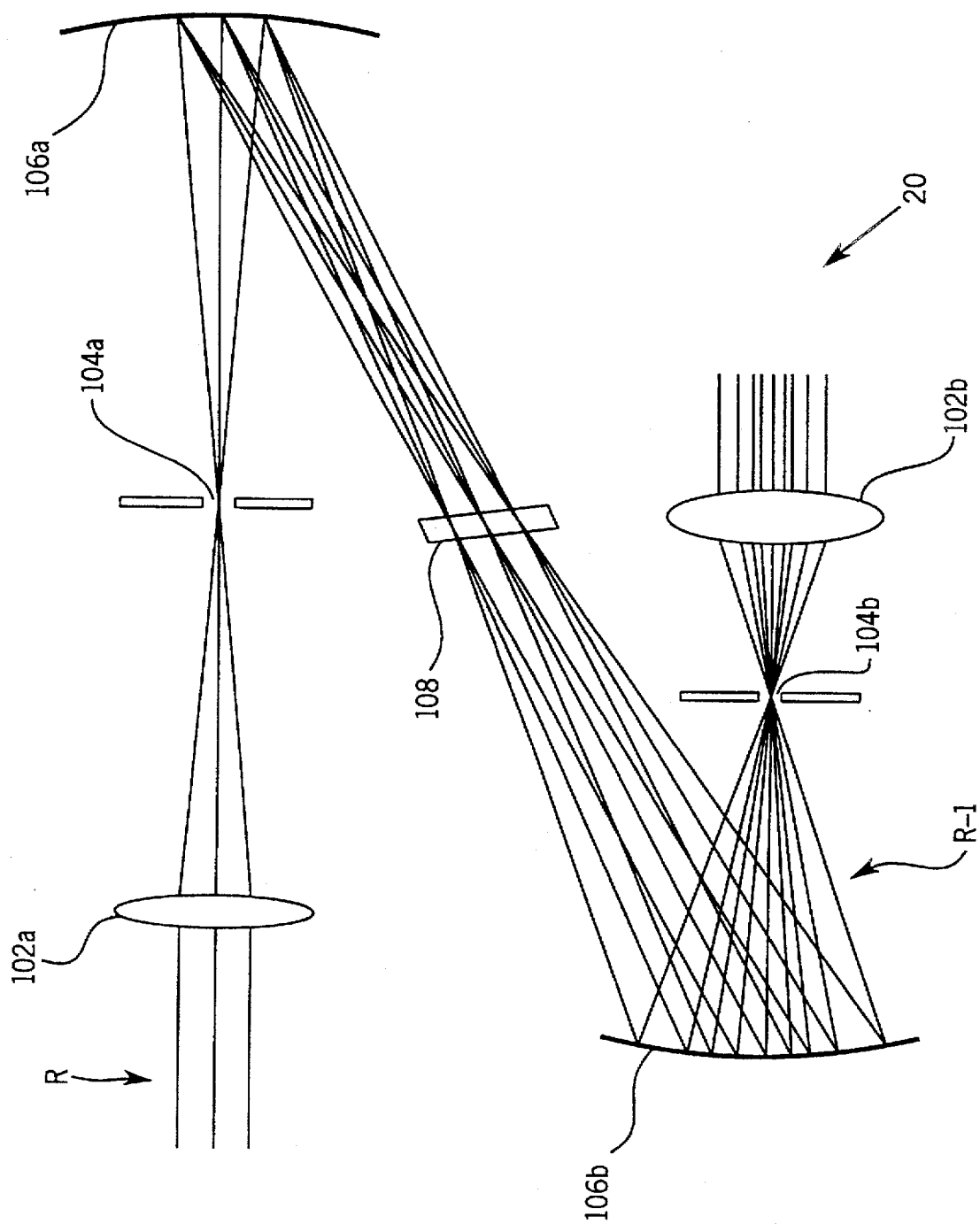
FIG. 1 is a schematic drawing of a first embodiment of a programmable standard of the present invention.

Briefly, the present disclosure provides a programmable standard useful in a correlative spectrophotometric apparatus comprising a dispersive element, a spatial filter optically aligned to receive light from the dispersive element, and a means for recombining the dispersed light which is optically aligned to receive light from the spatial filter.

A preferred dispersive element is a diffraction grating, most preferably a concave diffraction grating. The spatial filter is preferably a transmissive spatial filter; most preferred is a liquid crystal spatial filter. A preferred means for recombining the dispersed light is a spectrograph oriented to de-disperse the spectrum which remains after the light passes through the spatial filter.

Still further, the invention provides a programmable standard of the invention whereby the dispersive element and the recombining element are combined into a single dispersive element by the use of a reflective spatial light modulator.

The invention further provides a programmable standard having a beam expander, a continuously varying filter, a transmissive spatial light modulator, and a second beam expander.

The present invention further provides a correlation spectrometer that contains a programmable standard of the present invention. In one preferred embodiment of this aspect of the invention, the programmable standard comprises a first means for dispersing a beam of light, a variable color filtering means which is optically aligned to receive light from the first means for expanding, transmissive means for spatially modulating light which is optically aligned to receive light from the variable color filtering means, and a second means for expanding light which is optically aligned to receive light from the transmissive modulating means.

Also provided is a noninvasive process of determining the concentration of an optically absorbing compound in a biological sample. In accordance with that process, a spectrum of light passing through the sample is compared to a spectrum of light passing through a programmable standard of the invention. The spectra are correlated to determine the concentration of the compound. In a preferred embodiment of this aspect of the invention, the dispersive element and the recombining element are combined into a single element in conjunction with a reflective spatial light modulator. Preferably, the process is used to measure glucose concentration in body fluids.

DETAILED DESCRIPTION OF THE INVENTION

As used here, the term "analyte" or "component" means any chemical or elemental compound which absorbs light and for which quantitative or qualitative measurements may be desired. Thus, the analyte or component of interest include those of clinical and/or medical, environmental, or industrial significance. Examples of specific analytes or components of biological interest are well known and include analytes of clinical significance as glucose, hemoglobin, lipids, cholesterol, protein, etc. Other analytes will be readily apparent to those skilled in the art.

The present disclosure provides a programmable standard for use in correlation spectrometry. The programmable standard of the invention replaces standards currently employed in correlation spectrophotometers and is thus useful wherever such instruments are employed. In a preferred method, the programmable standard is used in the noninvasive detection and quantification of specific components or analytes in a biological sample.

Thus the present invention also provides a correlation spectrophotometer which employs a programmable standard of the invention.

In addition, a process is disclosed whereby the programmable standard of the invention may be utilized for the noninvasive detection and/or determination of an optically absorbing compound in a biological sample.

As will be described in more detail below, the programmable standard of the invention comprises a dispersive element, or sometimes referred to as a means for dispersing light, a spatial filter optically aligned to receive light from the dispersive element, and a means for recombining the dispersed light which is optically aligned to receive light from the spatial filter.

The dispersive element, spatial filter and recombining element are optically aligned in such a manner that light is routed from the dispersive element to the spatial filter and then to the recombining element. The means for optical alignment will be apparent to those skilled in the art and will be discussed in more detail with respect to specific embodiments.

As is well known in the art, spectrographs may advantageously be composed of separate dispersive and focusing means and the programmable standard of the invention can further include such elements. For example, Czerny-Turner grating spectrographs include an entrance aperture followed by a collimating mirror, followed by a plane diffraction grating, followed by a focusing mirror, followed by an exit aperture. Thus, following the teachings of the present invention, the simple collimating and focusing mirrors may be replaced by simple or compound lenses, compound mirrors, focusing holographic optical elements (HOEs), binary optical elements, or other focusing optics.

The function of the dispersive element is to disperse or separate light into its component wavelengths. Dispersive elements are well known in the art and dispersion is most readily accomplished by passing a light beam through a slit or aperture and across a surface, most commonly, and preferably, a diffraction grating, and thereby directing and/or focusing the dispersed light. Light beams impinging on the dispersive element, therefore, result in a set of light beams, the direction of each correlating to its wavelength. The beams are focused at a spatial filter. Different positions at this spatial filter correlate to the wavelength.

Most preferably, the dispersion and focusing element is combined in a concave diffraction grating. However, other suitable alternatives, such as HOEs, binary optical elements, and dispersing prisms, preferably with curved light surfaces which serve to focus the light, are readily apparent and will be suitable for use in the invention.

As is readily apparent, the dispersive element of the invention functions in a manner similar to such elements as found in dispersive spectrographs known in the art and, thus, any such elements are suitable for use in the present invention. For example, Czerny-Turner grating spectrographs include an entrance aperture followed by a collimating mirror, followed by a plane diffraction grating, followed by a focusing mirror, followed by an exit aperture. Thus, the plane grating may be replaced with a dispersive optical element, a dispersive binary optical element, or a dispersing prism.

At a minimum, the dispersed light will be refocused and passed through an exit aperture, by way of lens, apertures, etc. known in the art. However, as discussed below, it is preferred that a second dispersive element will serve to refocus the dispersed light.

After passing through the dispersive element, the light is passed through a spatial filter. The spatial filter functions to modulate the light and can be of the transmissive or reflective modulator type. As presently preferred, the spatial filter is a transmissive liquid crystal modulator, however, other spatial light modulators are known and/or are commercially available, for example, liquid crystal, magneto-optic, electro-optic spatial light modulators.

In a preferred embodiment, the spatial filter serves as both the exit aperture of the dispersing element and as the entrance aperture to the element which recombines the dispersed light.

After passing through the spatial filter, the dispersed spectrum is recombined or de-dispersed. Thus any means for recombining the light into a single beam is suitable for use in the present invention, including, without limitation, a spectrograph, condensing lens, condensing mirror, or diffraction grating.

EMBODIMENTS

An illustration of an embodiment of a programmable standard 20 is presented in FIG. 1. An input beam of light R, light that has passed through a beam splitter in a correlation spectrophotometer, is routed through a first lens 102a and first aperture 104a to a dispersive element 106a. As discussed above, this dispersive element 106a functions to separate the light into its component wavelengths. Light leaving dispersive element 106a is directed to a spatial filter 108. The spatial filter can be a transmissive spatial light modulator (SLM) (as shown in FIG. 1) or, alternatively, a reflective spatial light modulator. The use of reflective spatial light modulators requires the repositioning of the optical alignment (not shown) such that the entrance and exit apertures are near one another, either above and below or side by side. Exemplary of well known reflective spatial light modulators is a reflective liquid crystal modulator.

The light beams pass through (or, when a reflective spatial light modulator is utilized, reflect from the surface of) spatial filter 108, which controllably and selectively attenuates the desired light beam. Because the position of each light beam correlates to its wavelength, spatial filter 108 controllably and selectively attenuates desired wavelengths of the input light beam.

Spatial filter 108 is programmable. For example, the filter can be a transmissive liquid crystal modulator controlled by a computer. Each pixel in a SLM is responsible for a different wavelength band and thus, by controlling the transmittance of individual pixels in the liquid crystal modulator, the computer therefore programmably controls the attenuation of various wavelengths of light in the beam.

The program for the spatial filter is derived from measurements of actual material. The compound of interest is measured on a conventional spectrophotometer, e.g., scanning monochromoter, scanning interferometer, or spectrograph, and the transmission data for that compound is stored in a computer. This data is scaled for use on the spatial light modulator and stored in the controlling electronics. By way of example, U.S. Pat. No. 4,975,581 describes the use of statistical methods such as partial least squares (PLS) or classical least squares (CLS) to convert the spectra of several known biological samples into a calibration model. The model is then compared to the measured spectrum to determine the concentration. Alternatively, a neural network such as that described in U.S. Pat. No. 5,267,151 can be used to perform the filtering and classification. In this method, the network is trained using spectra from several known biological samples. The spectra of the unknown sample is then classified using the trained network. Thus, the programmable standard of the invention can be generated in a similar manner, where the output of the nural network is the program for the filter.

In the simplest technique, the electrical control of each pixel causes that pixel to modulate a wavelength band equivalent to the amount of modulation due to a chemical standard. In this case, the data is scaled by transforming the measured transmission of the standard sample to an analog or digital signal. Since this transformed signal controls a pixel, the transmission of a single pixel is the same as the transmission of the standard at that wavelength.

In a more elaborate technique the pixel is controlled to produce a transmission that distinguishes the sample from interfering substances or other noise. Since some pixels will more effectively distinguish sample from noise and interfering substances, the controlling algorithm may be advantageously set for a stronger or lighter transmission than would be found in a reference sample.

When a sample is presented to the instrument, the controlling electronics writes the data to the modulator and makes the correlation measurements. If desired, the controlling electronics can present another spectrum for correlation until all such spectra are compared.

An advantage of the present invention is that it improves the functionality and flexibility of correlation spectrometers. Existing instruments can only detect one constituent at a time. An apparatus in accordance with the present invention allows any number of constituents to be measured without the need to physically remove and change the standard. In addition, because this invention uses a programmable standard, the degradation associated with physical standards is eliminated.

After the selective attenuation of the light in spatial filter 108, the beams are routed to a recombining element 106b which recombines the beams into an output beam R-1. In this embodiment, element 106b is a second dispersive element.

Output beam R-1 is routed through a second aperture 104b, and a second lens 102b. Aperture 104b and lens 102b are positioned to focus light leaving second dispersive element 106b as it passes to a detector of a correlation spectrophotometer (not shown).

In another embodiment of a programmable standard of the invention, the spatial filter is a reflective spatial light modulator. In this embodiment, the dispersive element and recombing means are replaced with a single dispersive element. In this embodiment, the dispersive element and spatial filter are aligned so that light is routed from the dispersive element to the filter and then back to the dispersive element. Such an embodiment can also include focusing elements as described previously. An illustration of such an embodiment 20-1 is shown in FIG. 2.

Figure 2:
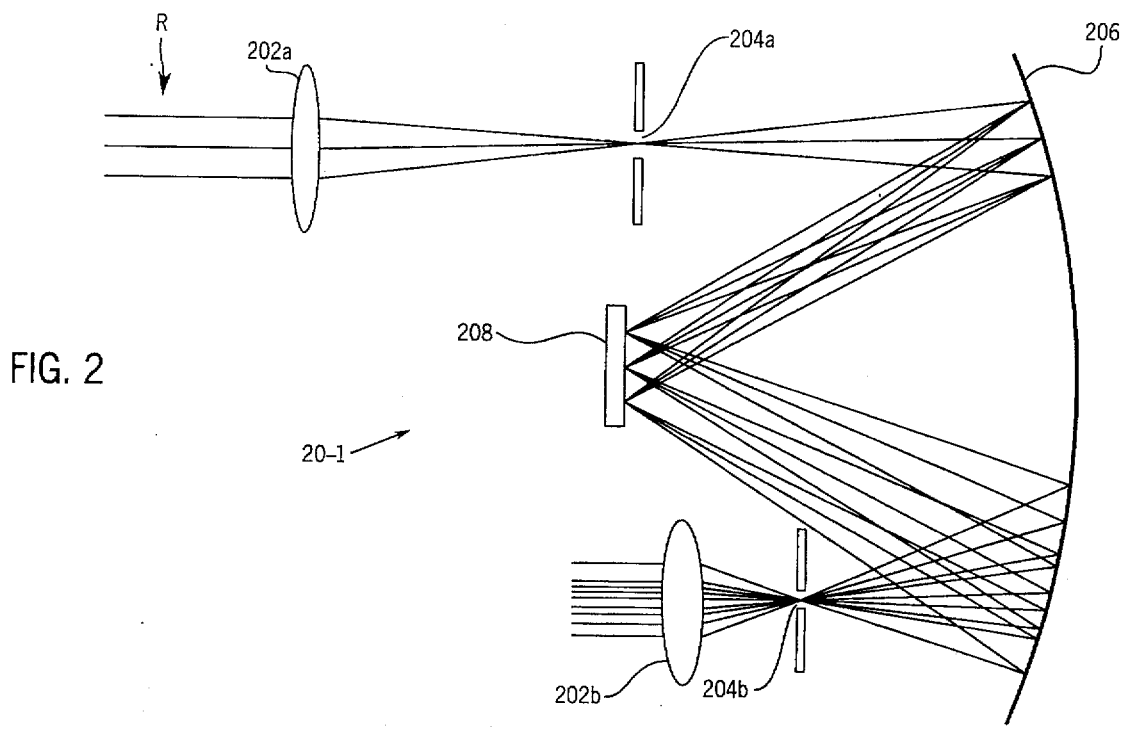
FIG. 2 is a schematic drawing of a second embodiment of a programmable standard of the present invention.

With reference to the programmable standard 20-1 of FIG. 2, an input light beam R is routed through a first lens 202a and first aperture 204a to a first location on dispersive element 206. As described earlier, dispersive element 206 separates the incoming beam into its component wavelengths, forming beams whose position correlates to their wavelengths.

Light leaving dispersive element 206 is directed to a reflective spatial light modulator 208 and then back to a second location on dispersive element 206 to be recombined. The recombined light is then routed through a second lens 202b and second aperture 204b optically aligned to direct light leaving dispersive element 206 to a detector (not shown in FIG. 2).

A further alternative embodiment of a programmable standard of the invention uses a continuously varying filter in place of the dispersive and recombining elements. In this embodiment it is preferred that the continuously varying filter is a coated interference filter with the unusual property that the bandpass wavelength depends upon position in the filter. An exemplary and preferred such filter is a transmissive glass filter that transmits blue light at one end, red light at the other end and transmits various parts of the visible spectrum in-between.

In accordance with such an embodiment of the invention, a programmable standard includes a first beam expander, a continuously varying filter optically aligned with the first beam expander, a spatial filter optically aligned with the varying filter, and a second beam expander optically aligned with the spatial filter. Again, when the spatial filter is a transmissive spatial light modulator it is preferred to use a transmissive liquid crystal modulator.

Figure 3:
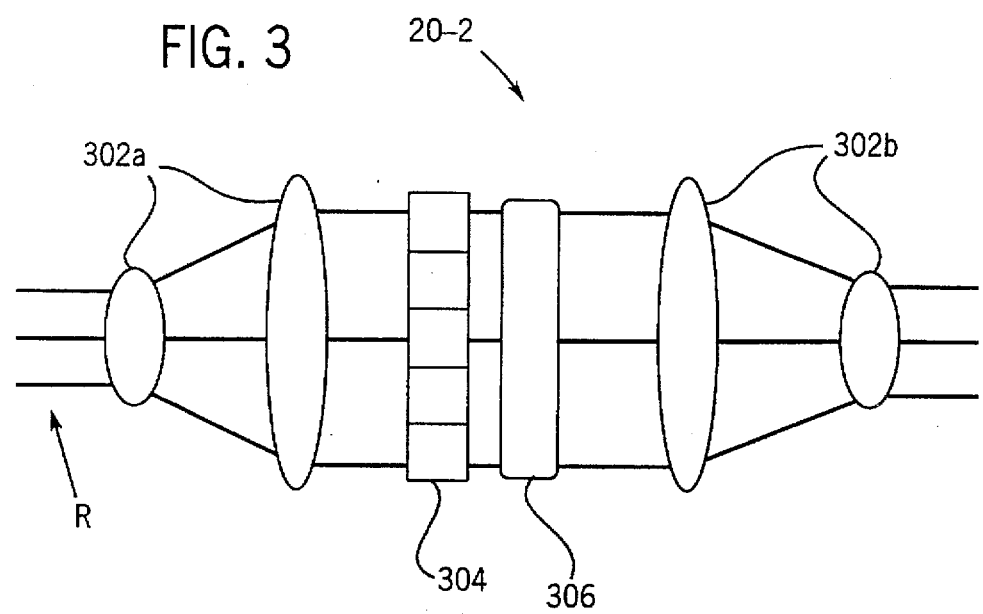
FIG. 3 is a schematic drawing of a third embodiment of a programmable standard of the present invention.

An illustration of such an alternative programmable standard 20-2 is shown in FIG. 3. An input beam of light R is expanded by a first beam expander 302a. The expanded beam passes through a continuously varying filter 304, which transmits different wavelengths of light at different locations. For example, the varying filter 304 may transmit red light at one end and blue light at the other end, with intermediate wavelengths transmitted at the locations in between.

After passing through varying filter 304, the expanded beam passes through a spatial filter such as a transmissive spatial light modulator 306. Preferred transmissive modulating means are the same as set forth above.

Transmissive spatial light modulator 306 controllably and selectively attenuates different spatial portions of the beam, which correspond to the wavelengths transmitted by the continuously varying filter 304 at these locations. The effect is a beam which has its component wavelengths controllably and selectively attenuated. The light beam is then directed to a second beam expander 302b that contracts the light.

This embodiment accomplishes the same result as the prior embodiments but has the advantages of not using dispersive elements and being much less sensitive to mechanical alignment. However, this embodiment couples less power to the detector because most of the energy is eliminated by the filter.

Yet another embodiment provides an enhanced subtractive correlation spectrometer containing a programmable standard. In existing correlation spectrophotometers, a broad band light source illuminates the sample of interest and the sample spectrally modifies the light that passes through it. This modified light enters the spectrometer and is split into two separate paths.

The first path is sent through a standard filter and then to a detector. The second path is sent through a neutral density filter and a second detector. The absorbance of the neutral density filter is adjusted so that the signal detected by the two detectors is the same when no sample is present.

A subtractive correlation spectrometer measures the difference in spectra. Light that passes through the sample will be absorbed at specific wavelengths. If the sample contains the compound of interest, then those specific wavelengths will be absorbed as well.

When this light passes through the standard filter, no more light will be absorbed because the energy at those wavelengths has already been eliminated. The light that passes through the neutral density filter will be absorbed because it is a broad band absorber.

This difference in absorption creates a difference in the values measured at the detectors. This difference is correlated to how well the sample matches the standard following techniques known in the art (e.g., see Cha and Gable, "Study On Infrared Gas-Filter Correlation Spectrometer For Measuring Low-Concentration Methanol Gases," *Optical Engineering*, 25:12, pp. 1200–1303 (December, 1986).

An apparatus in accordance with the present invention provides a correlation spectrophotometer that contains a programmable standard as set forth above. One embodiment of such a spectrophotometer includes a source of light, a sample holder, a beam splitter that produces two beams of light, a neutral filter to receive a first beam of light, a programmable standard for receiving a second beam of light, and first and second detectors for receiving light from the filters.

The spectrophotometer further includes a data processor or analyzer that correlates the detected light from the two filters to a concentration of the optically absorbing compound. One embodiment of an apparatus 10 of the present invention is shown in FIG. 4.

Figure 4:
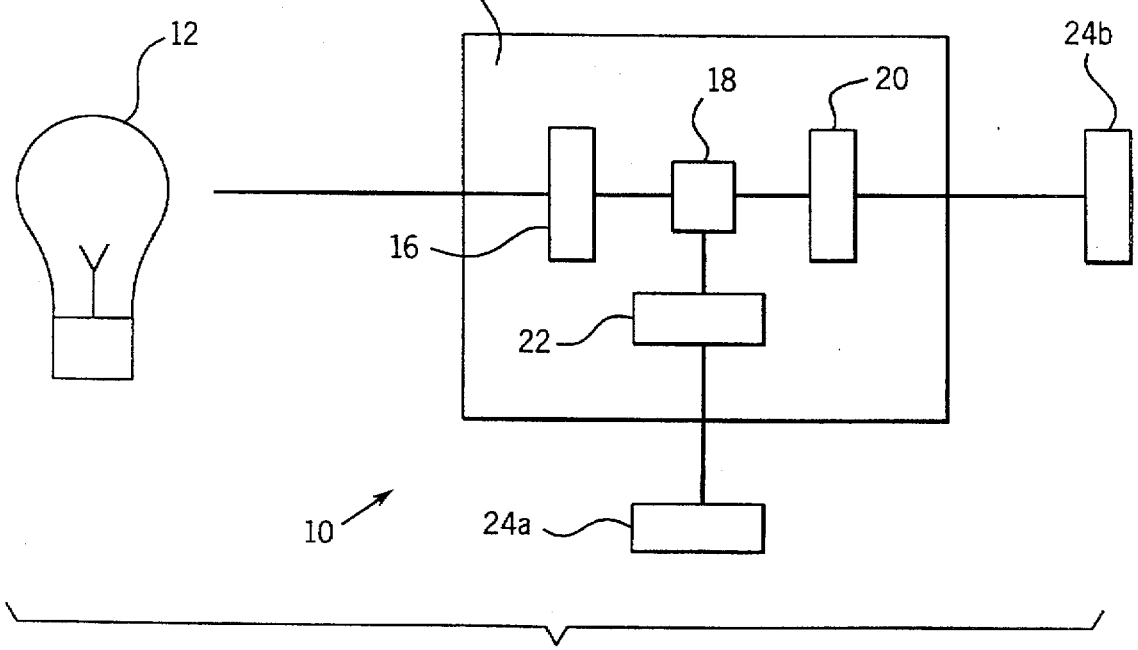
FIG. 4 is a schematic drawing of a first embodiment of a spectrophotometer of the present invention.

With reference to FIG. 4, the apparatus 10 includes a light source 12, an optical element 14, and at least two optical detectors 24a–b. Optical element 14 directs a beam of light (infra-red or visible) produced by light source 12 through a sample holder 16. Optical element 14 generally divides the light beam into two separate beams with the use of a beam splitter 18.

The first beam passes through a filter element 22 to a first optical detector 24a. The second beam passes through a programmable standard 20 to a second optical detector 24b. Any of the above described programmable standards of the invention can be used. Preferred embodiments of programmable standards are set forth above. A preferred first filter element is a neutral density filter.

Operation of apparatus 10 can be understood by reference to FIG. 4. First, the apparatus is operated with no sample present in the sample holder. Light source 12 generates a visible or infra-red light beam which is split by the optical element 14 into two beams.

The first beam passes through filter 22. A neutral density filter uniformly attenuates all wavelengths. Preferably, the neutral density filter is such that the intensity of the light beam that emerges from filter 22 is equal to the intensity of the output beam from programmable standard 20 when programmable standard 20 is programmed for the analyte of interest. The second beam passes through the programmable standard 20, which is programmed to selectively attenuate the wavelengths of light identically to the attenuation resulting from absorption by the analyte of interest.

It is of course understood that various features or elements of existing spectrometers may be substituted in the embodiments just described. For instance, a chopper may be used in place of the beam splitter.

The component or analyte of interest which can be measured with the use of the programmable standard of the invention is not important for the operation or usefulness of the invention. Thus any component of interest can be measured as disclosed herein. Preferably, the analyte is found in a biological sample. The analyte can be measured directly or in the biological sample (in vivo) or may be first partially or completely removed or extracted from the source material, e.g., the organism, for measurement, e.g. a sample of tissue, blood, urine, etc. (in vitro). Examples of analytes or components of interest are known and include the well known biological analytes of clinical significance such as glucose, hemoglobin, lipids, cholesterol, protein, etc. Other analytes will be readily apparent to those skilled in the art.

For example, to measure the concentration of an analyte, e.g., glucose, in a sample, programmable standard 20 is programmed to attenuate light in the region of known peak absorbance (e.g., glucose having a broad band peak at a wavelength of 1650 nm). The intensity of the output beam from programmable standard 20 is measured by detector 24b.

A sample is then introduced into sample holder 16. The sample attenuates the light beam in a manner dependent on the constituents of the sample. Any reduction in the intensity of the light beam by the sample yields a proportional reduction in the intensity measured by optical detector 24a because filter 22 attenuates all wavelengths equally.

The reduction in intensity measured by detector 24b, however, depends on the constituents of the sample. If the attenuation by the sample is due to constituents other than the analyte of interest, the intensity measured by detector 24b decreases about equally to the intensity of the first beam. If, however, the attenuation is due to absorption by the analyte of interest, there will be less decrease in intensity because of the selective attenuation by the programmable standard 20.

For example, light source 12 emits red, blue, and green light equally. When the optically absorbing compound being measured absorbs only green light, programmable standard 20 is programmed to attenuate green light. With no sample present, the intensity of the red and blue light passing through programmable standard 20 is equal to the intensity of the red, blue, and green light passing through filter 22.

When a sample is introduced, and if it does not contain the analyte of interest, it may attenuate all three wavelengths by 20%.

Therefore, both of the optical detectors 24a and 24b detect a 20 percent reduction in light intensity.

If the sample contains the analyte of interest, however, it may attenuate the red and blue light by 20% and the green light by 80%. In this case, the light intensity measured by detector 24a will decrease by about 40 percent. The light intensity measured by detector 24b, however, experiences only a 20 percent decrease because programmable standard 20 blocks the green light so only the 20 percent attenuation of the red and blue light is detected. The difference in intensity measured by the two detectors 24a and 24b, therefore, is indicative of the concentration of the analyte of interest in the sample.

The selectivity and programmability of the programmable standard 20 allows embodiments of this invention to specifically detect more than one analyte of interest by merely changing the attenuation characteristics of the programmable filter.

In still another aspect, the present invention provides a noninvasive process of determining the concentration of an optically absorbing compound in a biological sample. In accordance with that process, a spectrum of light passing through or reflected from the sample is compared to a spectrum of light passing through a programmable standard and the spectra are correlated to determine the concentration of the compound.

A process includes the steps of illuminating a sample with a light beam, splitting light leaving the sample into a first and second light beam, directing the first light beam to a neutral filter and the second light beam to the programmable standard. Light from the neutral filter and the programmable standard is detected and correlated to the concentration of the compound.

Thus in one embodiment of this process of the invention, the second light beam is sequentially directed to a first focusing element, a first dispersive element, a spatial light modulator, a second dispersive element, a second focusing element, and the second detector. Preferably, the first and second focusing elements include apertures and the spatial light modulator includes a transmissive spatial light modulator such as a transmissive liquid crystal modulator.

In another embodiment, the second light beam is sequentially directed to a first focusing element, a dispersive element, a reflective spatial light modulator, back to the dispersive element, a second focusing element and the second detector. The reflective spatial light modulator is preferably a reflective liquid crystal modulator.

In still another embodiment, the second light beam is sequentially directed to a first beam expander, a continuously varying filter, a transmissive spatial light modulator, a second beam expander and the second detector light.

A process in accordance with the present invention can be carried out by an apparatus as set forth above. Preferred optically absorbing compounds to be measured are those body fluid analytes mentioned above. More preferred are glucose, lipids, proteins, hemoglobin, cholesterol, etc., glucose being most preferred.

The present invention has been described with reference to preferred embodiments. Those embodiments are not limiting of the claims and specification in any way. One of ordinary skill in the art can readily envision changes, modifications and alterations to those embodiments that do not depart from the scope and spirit of the present invention.

What is claimed is:

1. A noninvasive process of determining the concentration of an optically absorbing compound in a biological sample comprising comparing a spectrum of light passing through the sample with a spectrum of light passing through a programmable standard and correlating the spectra to determine the concentration of the compound, said programmable standard comprising (1) a dispersive element; (2) a spatial filter aligned to receive light from the dispersive element; and (3) a means for recombining the light which is reflected from the spatial filter, said means for recombining the light being optically aligned to receive light from the spatial filter.

2. The process of claim 1 including the steps of:
   a) illuminating the sample with a light beam;
   b) splitting light leaving the sample into a first light beam and a second light beam;
   c) directing the first light beam to a neutral filtering means and the second light beam to the programmable standard;
   d) detecting light from the neutral filtering means and the programmable standard; and
   e) correlating the detected light from the neutral filtering means and the programmable standard to the concentration of the compound.

3. The process of claim 2 wherein the first light beam and the second light beam are directed by apertures and the spatial filter includes a reflective spatial light modulator.

4. The process of claim 3 wherein the reflective spatial light modulator includes a reflective liquid crystal modulator.

5. The process of claim 2 wherein the second light beam is sequentially directed to a first means for focusing light, the dispersive element, the spatial filter which reflects light back to the dispersive element, a second means for focusing light, and the second means for detecting light.

6. The process of claim 5 wherein the spatial filter includes a reflective spatial light modulator.

7. The process of claim 6 wherein the reflective spatial light modulator includes a reflective liquid crystal modulator.

8. The process of claim 1 wherein the optically absorbing compound is glucose.

9. A noninvasive process of determining the concentration of an optically absorbing compound in a biological sample comprising comparing a spectrum of light passing through the sample with a spectrum of light passing through a programmable standard and correlating the spectra to determine the concentration of the compound, said programmable standard comprising (1) a dispersive element; (2) a spatial filter aligned to receive light from the dispersive element; and (3) a means for recombining the light which passes through the spatial filter, said means for recombining the light being optically aligned to receive light from the spatial filter, said process including the steps of:
   a) illuminating the sample with a light beam;
   b) splitting light leaving the sample into a first light beam and a second light beam;
   c) directing the first light beam to a neutral filtering means and the second light beam to the programmable standard;
   d) detecting light from the neutral filtering means and the programmable standard; and
   e) correlating the detected light from the neutral filtering means and the programmable standard to the concentration of the compound, wherein the second light beam is sequentially directed to a first means for expanding light, a variable color filtering means, a transmissive means for modulating light, a second means for expanding light and the second means for detecting light.

* * * * *